No. 12,275. REISSUED OCT. 18, 1904.
H. T. KRAKAU.
DRAFT RIGGING.
APPLICATION FILED AUG. 13, 1904.
3 SHEETS—SHEET 1.
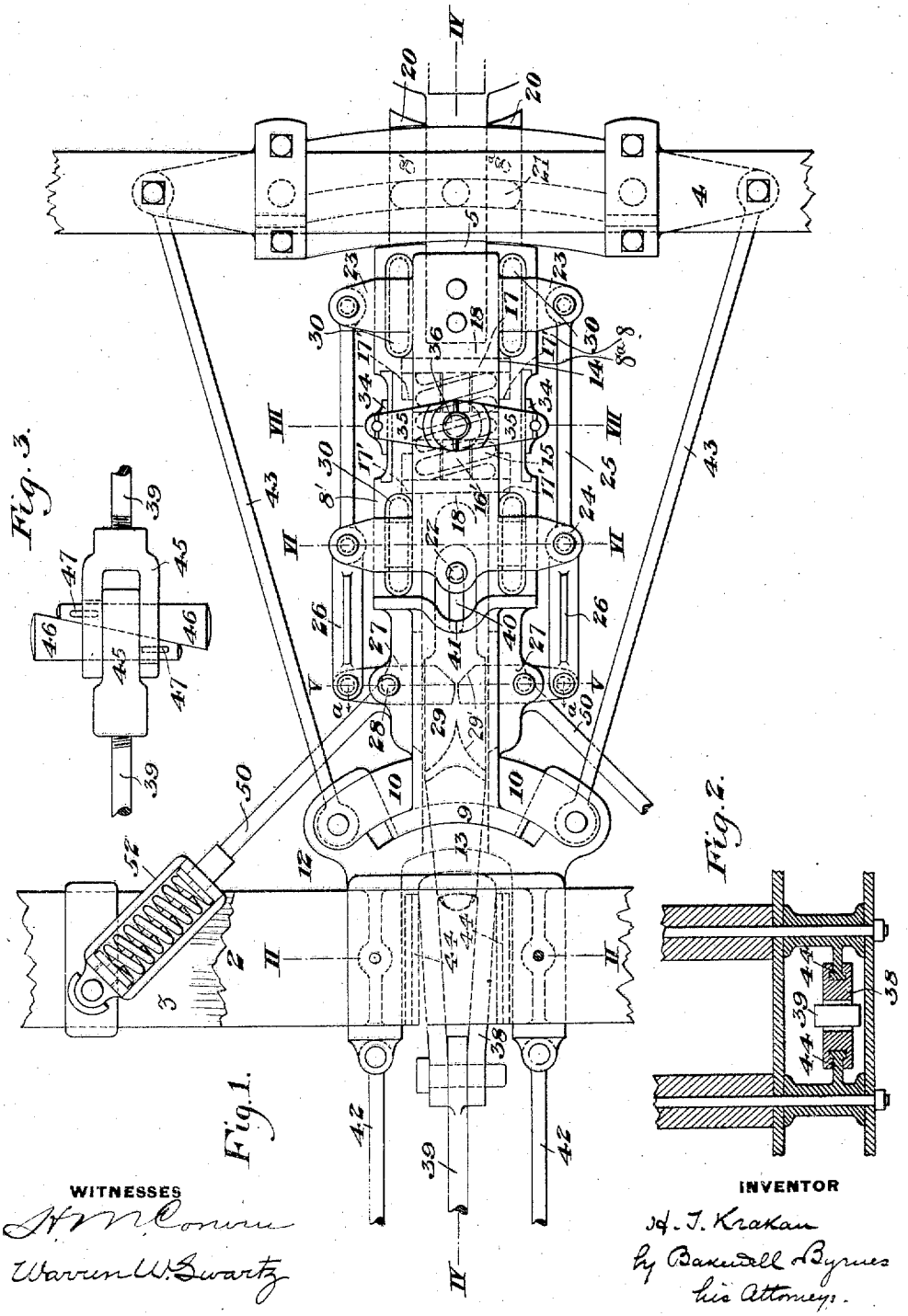
WITNESSES
W. M. Conway
Warren W. Swartz
INVENTOR
H. T. Krakau
by Bakewell & Byrnes
his Attorneys.

No. 12,275. REISSUED OCT. 18, 1904.
H. T. KRAKAU.
DRAFT RIGGING.
APPLICATION FILED AUG. 13, 1904.
3 SHEETS—SHEET 2.
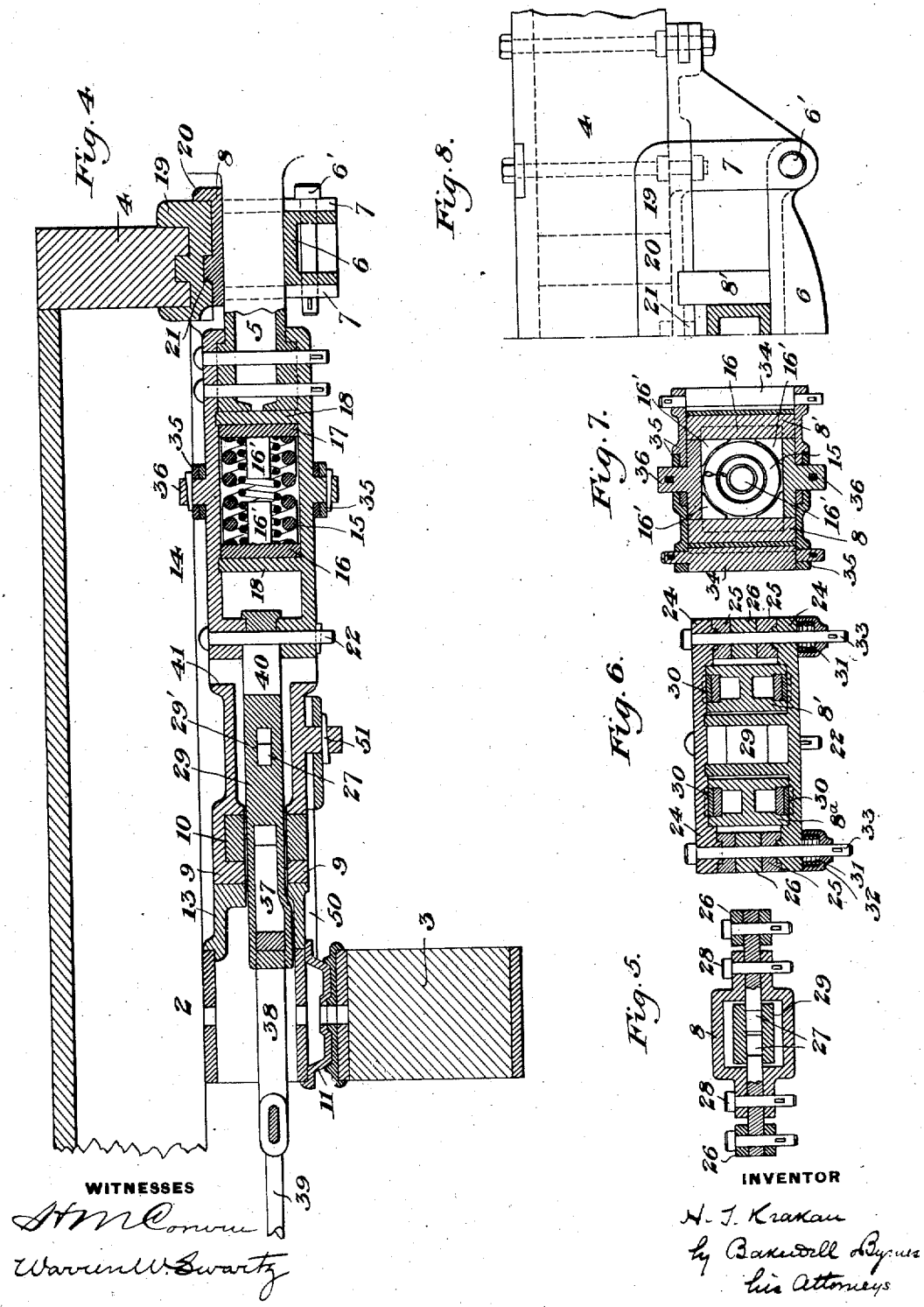
WITNESSES
A. M. Conover
Warren W. Swartz
INVENTOR
H. T. Krakau
by Bakewell Byrnes
his Attorneys No. 12,275. REISSUED OCT. 18, 1904.

H. T. KRAKAU.

DRAFT RIGGING.

APPLICATION FILED AUG. 13, 1904.

3 SHEETS—SHEET 3.

WITNESSES

H. M. Conover

Warren W. Swartz

INVENTOR

H. T. Krakau by Bancroft & Byrnes his Attorneys

No. 12,275. Reissued October 18, 1904.

UNITED STATES PATENT OFFICE.

HARRY T. KRAKAU, OF CLEVELAND, OHIO, ASSIGNOR TO THE NATIONAL MALLEABLE CASTINGS COMPANY, OF CLEVELAND, OHIO, A CORPORATION OF OHIO.

DRAFT-RIGGING.

SPECIFICATION forming part of Reissued Letters Patent No. 12,275, dated October 18, 1904.

Original No. 720,526, dated February 10, 1903. Application for reissue filed August 13, 1904. Serial No. 220,684.

*To all whom it may concern:*

Be it known that I, HARRY T. KRAKAU, of Cleveland, in the county of Cuyahoga and State of Ohio, have invented a new and useful Improvement in Draft-Riggings, of which the following is a full, clear, and exact description, reference being had to the accompanying drawings, forming part of this specification, in which—

Figure 9:
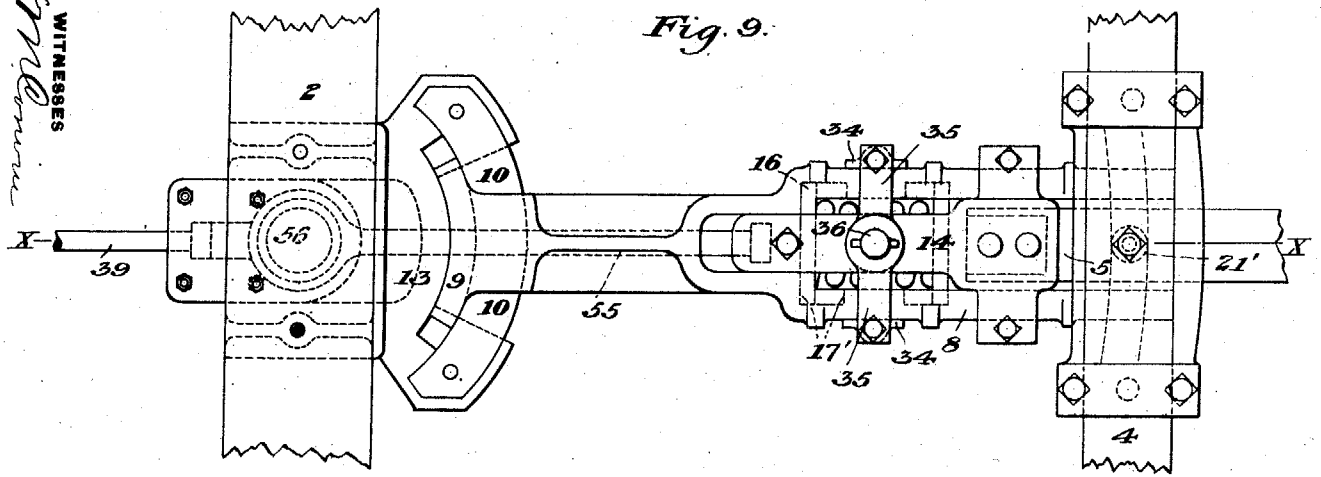
Figure 10:
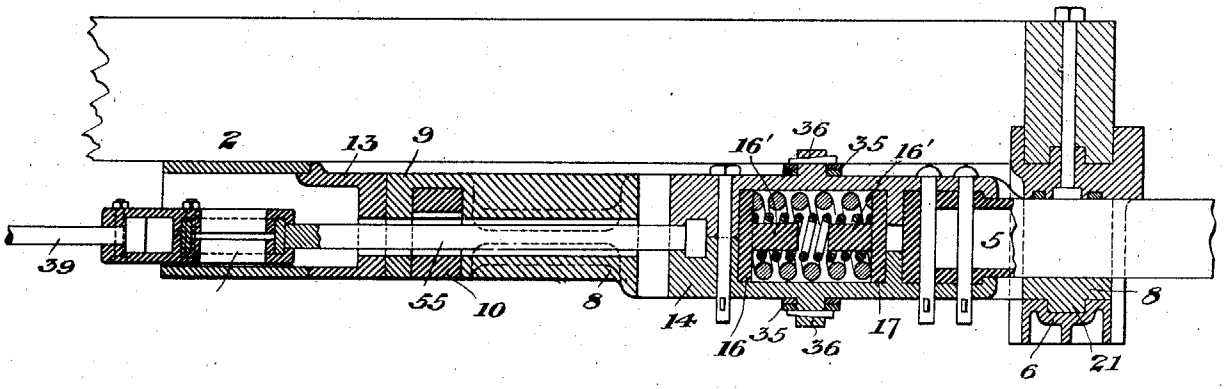

Figure 1 is a plan view of my improved draft-rigging. Fig. 2 is a vertical section on the line II II of Fig. 1. Fig. 3 is a detail view. Fig. 4 is a longitudinal central section. Figs. 5, 6, and 7 are vertical cross-sections on the lines V V, VI VI, and VII VII, respectively. Fig. 8 is a partial end elevation of the end sill. Figs. 9 and 10 show a modification, Fig. 9 being a plan view and Fig. 10 a longitudinal central section.

In the accompanying drawings, 2 represents the body-bolster of a car. 3 is the truck-bolster. 4 is the end sill, and 5 is the shank of a draw-bar supported beneath the end sill by a carry-iron 6, which is upheld from the sill by a suitable bracket or support 7. A frame 8 extends back from the sill nearly to the bolster, where it terminates in a head 9, constituting the end of the draft-rigging and suitably shaped to fit upon parallel segment-bars 10, which are curved from a center, preferably substantially coincident with the axis of the center plates 11 of the car-truck. The segment-bars 10 are secured to or form part of a frame 12, which is attached to the body-bolster, and a metal piece 13, interposed between the bolster and the end of the head 9, backs the head and transmits to the bolster the strains of buffing, thus relieving the segment-bars 10. The frame 8 may be a single casting or made of several sections. The preferred form is sufficiently indicated by the several cross-sectional views without needing further description, the parts of the frame at the rear of the draw-bar being separated laterally into two branches 8ª 8′ to accommodate the straps of the yoke 14, which extends rearwardly from the draw-bar and contains the draft spring or springs 15 and the followers 16 17. The outer sides of these followers bear against projections or webs 18, fixed to or forming part of the yoke, and are adapted to be engaged by stops 17′ on the frame 8 when they are at the limits of their motion. They also have projections 16′ at their middle and corners, which serve as stops to check the spring before it passes the proper limit of its compression. The webs 18, although not indispensable, are desirable, because they impart great strength to the yoke, being preferably made integral with one of its arms and fitted in notches in the other arm. They may be replaced by any suitable projections on the yoke, or the forward web 18 may be omitted and the follower 17 arranged to make direct contact with the rear end of the draw-bar.

The frame 8 is movable circularly on the segment 10 and at its front end is slidingly connected with the sill 4 or with a shoe 19 thereon by suitable means, such as a lip 20, which engages the outer end of the shoe, and a projection 21, which fits in a guiding-groove in the shoe and permits the swinging of the frame on the segments 10. The end sill being thus braced by the interposition of the frame 8 between the sill and bolster is enabled to resist severe buffing blows without breaking, and I thus obviate what has been a prolific source of injury to railway-cars. This feature of my invention I regard as new without reference to the swinging of the frame on the rear bearing. It enables me to transmit the strains of buffing and draft longitudinally to the sill and bolster without the intervention of draft-timbers and lateral bolts, which heretofore have been the parts of the draft-rigging most liable to injury and requiring most frequent renewal.

The yoke 14 is preferably made of two straps attached at the front end to the shank of the draw-bar and connected together at the rear end by a pin 22. It preferably has laterally-projecting arms 23 24, connected and braced by rods 25, and the arms 24 are connected by links 26 with levers 27, which are fulcrumed on pins 28 to the frame 8 and have their ends fitting in a socket 29′ in a bar 29. This bar is connected at 40 to the pin 22 and extends rearwardly past or between the segments 10. The yoke 14 slides upon the parts of the frame 8, being preferably fitted with slide plates or shoes 30, and in order to create frictional resistance to the longitudinal motion of the yoke I prefer to draw its parts together upon the frame by springs 31, fitted in caps 32, held by wedges or keys 33, which keep the springs in tension. In order to provide further for resistance to the motion of the yoke upon the frame, I may employ shoes 34, bearing against the sides of the frame and connected by levers 35 with a stud 36 at the middle of the yoke, so that as the yoke moves backward or forward in buffing or pulling the stud will move the levers and will cause the shoes 34 to bind or press against the sides of the frame and to oppose to its motion a frictional resistance which increases in proportion to the length of travel of the yoke and to the force exerted upon the yoke by the pulling or buffing.

The rear end of the yoke 14 is adapted to engage a stop portion 41 on the frame 8 and to be limited thereby in its backward motion. The frame 12 may be braced and connected by rods 42 with the bolster at the other end of the car and by rods 43 with the end sills or with projecting portions of the shoes 19.

The bar 29 has a longitudinal slot 37, in which is fitted a link 38, extending rearwardly through the bolster 2 and connected by a rod 39 with a corresponding part at the other end of the car. The link 38 affords to the parts at or near the axial line of the truck center plate a flexible connection, which permits the draft-rigging to swing freely on the segment-bars. I may provide the sides of the link 38 with slideways fitting against parallel slides 44 on the bolster, so as to guide the link in its longitudinal motion. In order to take up slack, I prefer to provide at the middle of the rod 39 a slack-adjuster comprising two interfitted links 45, provided with wedge-keys 46, having spring-cotters 47, which tend to draw the wedges together to compensate for any wear of the parts. The yoke 14 being made in two sections held together by removable bolts, the draw-bar may be detached readily from the car for purposes of substitution or repair by loosening the said bolts, withdrawing one of the pins 6′, by which the base of the carry-iron 6 is held at each end, dropping the carry-iron, and then removing the draw-bar and yoke from below. By taking off the segments 10 10 the frame 8 may also be detached and removed. This capability of my improved device affords great saving in labor, and the construction above described reduces largely the number of bolts by which the draft-riggings are held to the car.

In the operation of my device when the cars are passing a curve the draw-bars do not project rigidly in the middle longitudinal lines of the car-body, but they will swing laterally on centers substantially coincident with the center plates of the trucks. The draft is therefore always on a line which connects the center plates of the trucks, and in passing around curves the cars will not cramp the couplers or draft-riggings, which will remain in alinement with each other and by reason of their flexibility will prevent straining and wearing of the parts of the car and truck. When the car is uncoupled, the draft-rigging is kept projecting in proper position at right angles from the truck by guide-rods 50, which extend from a stud 51 on the frame 8 to the truck-bolster, spring-cages 52 being preferably interposed in these rods to render them somewhat extensible. When a pulling strain is exerted on the coupler, it will draw the yoke 14 forward, thus moving the projection 18 against the follower 16 and compressing the spring against the other follower 17, which is held by the stop 17′ on the frame 8. The strain will thus be transmitted to the frame 8 by the follower 17 and also by the shoes 34, which are forced frictionally against the frame and oppose resistance to the motion of the yoke. The strain thus transmitted to the frame 8 is exerted upon the end sill through the parts 20 and 21 and upon the curved segments 10 at the rear of the frame and is transmitted by the rods 42 to the other end of the car. The forward motion of the yoke will also draw with it the bar 29 and, acting through the link 38 and the rod 39 upon the corresponding mechanism at the other end of the car, will cause the springs at both ends of the car to act in unison. When a buffing force is exerted upon the coupler, it will move the yoke 14 rearwardly and by the action of the stud 36 and levers 35 will cause the shoes 34 to bind frictionally upon the sides of the frame and to resist motion of the yoke, as above explained. It will also move the follower 17 back and will compress the spring against the follower 16, which is held by its stops on the frame 8 and transmits the strain through these stops to the frame and thence to the sill 4 and curved segments 10, as above explained, the pressure on the curved segments being relieved by the bearing of the head 9 of the frame 8 against the bolster through the piece 13, which is interposed between the head and bolster. The rearward motion of the yoke acting through the links 26 and levers 27 will turn these levers in the direction of the arrows *a* on their pivots 28 on the frame 8 and will cause them to draw the bar 29 forwardly, thus pulling on the link 38 and rod 39, and through these parts the buffing force will be transmitted by a pulling motion from one end of the car to the spring mechanism and friction devices at the other end. By thus connecting the spring and friction mechanisms at the two ends of the car and causing them to work together I increase the efficiency of the draft-rigging, remove the strain from the car-frame, and render the mechanism stronger and more durable.

If the rod 39 should break or be injured, the working of the other parts of the draft-rigging will not be prevented; but in such case the draft-rigging at each end of the car will operate independently of the other. I do not know of any prior device having this function, since heretofore injury to the so-called "continuous connecting-rods" has put the entire spring mechanism of draft-rigging out of action.

It will be noticed that in the construction above described the frame along which the draw-bar and yoke move bears at one end against the bolster and at the other end against the sill, so as to distribute between the bolster and sill the strains of buffing and draft. This is true also of the construction shown in Figs. 9 and 10. In these figures the arms 23 and the lever mechanism 27 are not used; but a rod 55 and interposed circular link 56 at the axial line of the truck center plate connect the draw-bar with the rod 39, which extends to the other end of the car, and transmit directly thereto the force applied in draft, but not the force applied in buffing. In these figures I show the projection 24' formed on the under side of the frame 8 and adapted to engage the carry-iron 6.

Within the scope of my invention as defined in the claims I may modify the construction of the parts and may substitute other forms of spring mechanism, since

What I claim is—

1. A draft-rigging comprising a frame pivoted at its rear end so as to swing radially and supported on a car-frame, spring mechanism and a draw-bar carried by and movable along the frame, and a guiding connection between the frame and the car-truck; substantially as described.

2. A draft-rigging connected at the rear to a bearing on which it can swing, and a flexible connection extending to the draft-rigging at the other end of the car; substantially as described.

3. A draft-rigging connected at the rear to a bearing on which it can swing, and a flexible connection extending through the bolster to the draft-rigging at the other end of the car; substantially as described.

4. A draft-rigging connected at the rear to a bearing on which it can swing, and a flexible connection extending to the draft-rigging at the other end of the car, the flexible joint in said connection being situate at or near the axial line of the car-truck; substantially as described.

5. A draft-rigging having in combination with draw-bars and spring mechanism at both ends of a car, a connection between the said spring mechanisms, and means for converting a buffing motion of one draw-bar into a pulling motion on said connection; substantially as described.

6. A draft-rigging comprising a frame adapted to swing laterally on a rear bearing, a yoke movable along the same, friction-shoes bearing on the frame, and levers connecting the shoes with the yoke; substantially as described.

7. A draft-rigging comprising a frame, a yoke movable along the same and springs by which the yoke and frame are drawn into frictional contact; substantially as described.

8. In combination with the draw-bar and spring, a lever operated by motion of the draw-bar, and a connection extending from the lever to the spring mechanism at the other end of the car, whereby buffing motion on the draw-bar at one end of the car will be transmitted as a pulling motion to the other end; substantially as described.

9. A draft-rigging having in combination with the draw-bar and yoke, a frame, lever mechanism pivoted to the frame and connected with the yoke, and a longitudinally-movable bar connected with the lever and connected also with the spring mechanism at the other end of the car; substantially as described.

10. In a draft-rigging, the combination of a frame 8, a yoke movable along the frame, arms projecting from said yoke, and levers connected to said arms and adapted to actuate the connection extending from the rear of the draft-rigging; substantially as described.

11. The combination of a frame 8, a yoke movable along the same, lever mechanism 27 pivoted on the frame and connected with the yoke, and mechanism connecting the lever mechanism with the spring mechanism at the other end of the car; substantially as described.

12. A draft-rigging having, in combination with the draw-bar, a yoke, a frame, lever mechanism pivoted to the frame and connected with the yoke, a longitudinally-movable bar connected with the lever and connected also with the spring mechanism at the other end of the car, said frame being adapted to move laterally on a rear pivot; substantially as described.

13. A draft-rigging connected at the rear to a bearing on which it can swing, and a flexible connection extending to the draft-rigging at the other end of the car, said connection comprising a link having lateral guides at the bolster; substantially as described.

14. A draft-rigging arranged to be radially movable on a rear bearing, and having in combination with the draw-bar spring-followers and stops constituting a complete draft-rigging capable of individual action, and a longitudinally-movable connection leading to the draft-rigging at the other end of the car; substantially as described.

In testimony whereof I have hereunto set my hand.

HARRY T. KRAKAU.

Witnesses:

ALFRED J. SYMES, Jr.,
HARRY E. ORR.